United States Patent [19]

Khurana

[11] Patent Number: 4,588,334

[45] Date of Patent: May 13, 1986

[54] ADJUSTABLE CLOCKING NOSE PIECE

[75] Inventor: Sudershan K. Khurana, Marietta, Ga.

[73] Assignee: Lockheed Corporation, Burbank, Calif.

[21] Appl. No.: 648,074

[22] Filed: Sep. 7, 1984

[51] Int. Cl.$^4$ .......................................... B23B 51/06
[52] U.S. Cl. ........................................ 408/61; 408/97; 408/241 G
[58] Field of Search ................ 408/72, 84, 61, 710, 408/241 G, 97, 110

[56] References Cited

U.S. PATENT DOCUMENTS

| | | | |
|---|---|---|---|
| 2,335,614 | 11/1943 | Spievak | 408/84 |
| 2,382,639 | 8/1945 | Kennard | 408/110 X |
| 2,868,044 | 1/1959 | Chaffee et al. | 408/110 |
| 3,015,240 | 1/1962 | Hodnett | 408/84 |
| 3,620,636 | 11/1971 | Godard | 408/84 |
| 4,027,992 | 6/1977 | Mackey, Sr. et al. | 408/97 |
| 4,037,982 | 7/1977 | Clement | 408/61 |

Primary Examiner—Frank T. Yost
Attorney, Agent, or Firm—Stanley L. Tate

[57] ABSTRACT

Disclosed is a nose piece for a power drill and hand drill with certain modifications made to nose piece and using telescopic bushing, having a drill motor, a drill spindle and a drill bit attached to the spindle, the nose piece being capable of longitudinal adjustment with respect to the length of the drill bit and radial adjustment of its position with respect to the drill motor and the work piece.

8 Claims, 2 Drawing Figures

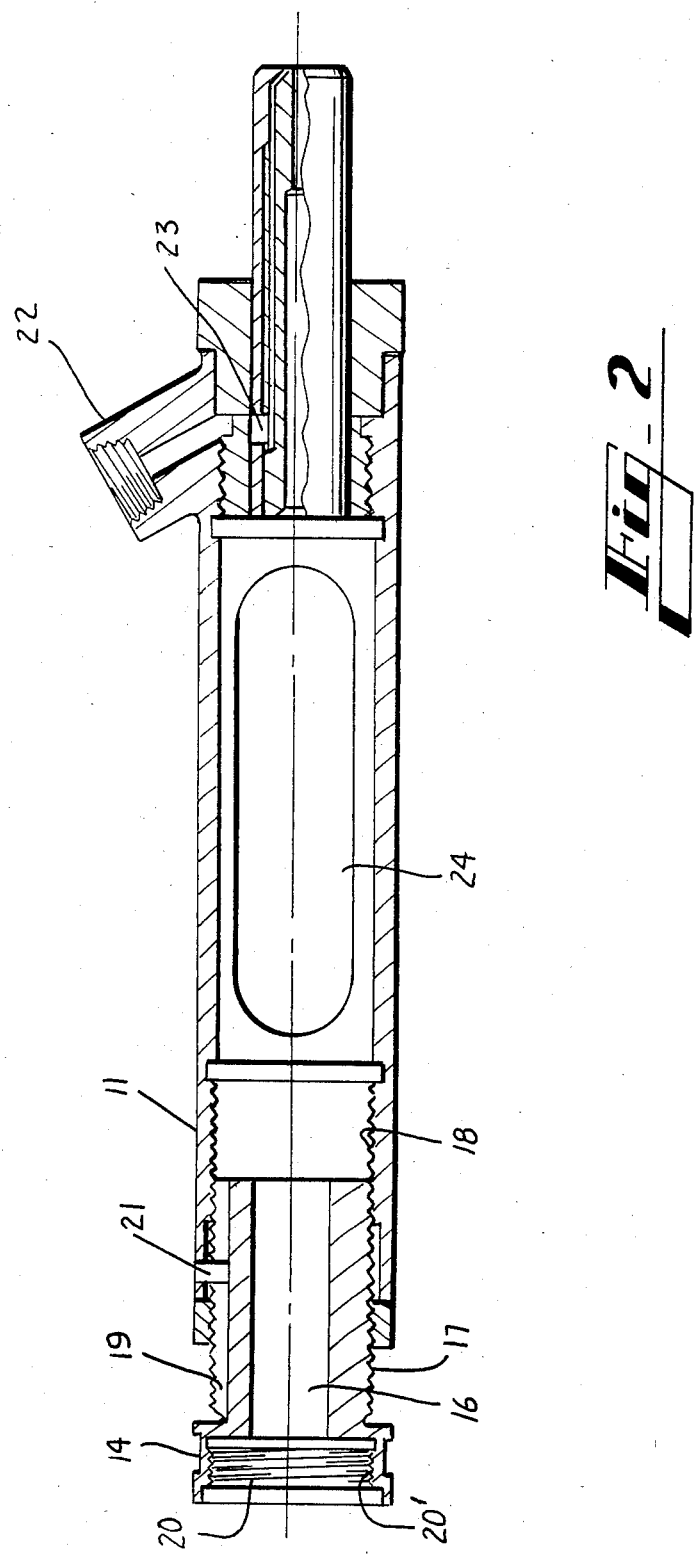

ADJUSTABLE CLOCKING NOSE PIECE

TECHNICAL FIELD

This invention relates in general to generating holes in a work piece, and in particular, to an accessory to a power drill for generating holes of a predetermined depth and diameter and in a predetermined pattern on the work piece.

BACKGROUND ART

In the past, power drills have been used to produce holes in a work piece. Also, in the past, accessories known as nose pieces have been used with power drills to fasten the drill into a drill jig or similar positioning device so that a hole produced would be properly positioned on the work piece. Also, nose pieces served to protect the drill bit from damage and to provide a conduit to carry coolant to the drill bit and to the point on the work piece drilled. In the past, however, when it was necessary to change the length of the drill bit being used, a specific nose piece was required because there was no nose piece with an adjustable length dimension available. Thus, it was necessary to keep a tool inventory which included a nose piece for each drill bit length. Additionally, the radial relationship between the nose piece coolant port and the work piece being drilled could only be changed by disassembling the drill and nose piece and reassembling them by shimming between nose piece and power drill to achieve correct positioning of coolant port position with respect to work piece. Shimming process is continued until proper positioning is achieved. This requires that an inventory of specially designed shims be carried. Such a method is time consuming and costly because of the large tool inventory required for each drill and drill bit, especially when changing drill bits after drilling every few holes. Thus, it can readily be seen that the prior art nose piece accessories available for use with power drills do not deal with the problems of length and angular adjustment of the accessory with respect to the drill bit and with respect to the part being drilled.

DISCLOSURE OF THE INVENTION

Accordingly, it is an object of the present invention to provide a nose piece accessory for a power drill that can be adjusted lengthwise with respect to the drill bit but which is installed on the drill.

It is also an object of the present invention to provide a nose piece accessory for a power drill that can be rotated about the axis of the drill bit installed in the drill so that the radial position of coolant ports and chip windows included in the nose piece can be changed with respect to the drill bit and the work piece without detaching the nose piece from the drill motor and without any need for shims.

The principal feature of the present invention is the provision of a unique nose piece accessory for a power drill which can be used with a variety of drill lengths whereas in accordance with current practice nose pieces having specific length dimensions are required to use with drill bits of specific lengths. In accordance with the present invention a nose piece is provided for a power drill which when attached to the drill and positioned in a drill jig properly positions the drill with respect to a piece being drilled. The nose piece is in the form of a generally cylindrical first housing which encloses the drill spindle and a drill bit attached thereto, means for attaching the cylindrical first housing to a drill motor and varying both the linear and radial relationships between the housing and the drill bit; bushing means connected on one end to the housing and on the opposite end to a drill jig so that the entire assembly is positioned with respect to a work piece and so that the drill bit must pass through the bushing to contact the work piece; and a clocking means for adjusting and fixing the linear and radial positions of the housing with respect to the drill bit and the work piece.

An additional feature of the present invention is the ability of the assembled nose piece to have coolant injected therein so that the coolant flows around the drill bit and onto the work piece.

Still another feature of the present invention is the ability of the nose piece to convey chips and dust away from the drill site during drilling.

Another feature of the present invention is the ability of the nose piece to accept interchangeable lock collar with bushings wihout being detached from the drill motor.

Yet another feature of the present invention is the ability of the nose piece to accommodate drill bits of various diameters merely by changing a lock bushing which forms a part of the bushing means.

An additional feature of the present invention is the capability of the nose piece to be firmly but removably secured to a drill jig or template which is attached to the work piece.

An important advantage of the present invention is the dual capability of the nose piece to be adjusted in length and angular relationship with respect to the drill bit and bushing length used and work piece being drilled.

In accordance with these and other objects, features and advantages of the present invention, there is provided a nose piece for a power drill, the power drill having a drill motor, a drill spindle, and a drill bit attached to the spindle which comprises a generally cylindrical first housing which encloses the drill bit and drill spindle; a means for attaching the housing to the drill motor and varying both the linear and radial relationships between the housing, the drill bit and the drill motor; bushing means connected on one end to the first housing and on the opposite end to a drill jig so that the drill bit must pass through the bushing means to contact a work piece; and clocking means for adjusting and fixing the linear and radial positions of the housing with respect to the drill bit, the work piece and the drill motor.

Also in accordance with the present invention the means for attaching the housing to the drill motor comprises a complimentary second housing circumferentially threaded to telescopically engage the first housing so that a variable relationship is created between the linear and radial positions of the first housing, the drill bit, the work piece; and means for coupling the second housing with the drill motor.

In accordance with the present invention the clocking means comprises a slip ring which surrounds the second housing and which has one edge notched to engage a complimentary notched edge on the adjacent end of the first housing; a pin projecting from the inner periphery of the slip ring to engage a slot running parallel to the long axis of said second housing and from end to end along the outer periphery of the second housing so that the position of the slip ring on the second housing may be varied along the long axis of the second housing but the radial position of the slip ring on the second housing remains constant; and a jam nut positioned between the slip ring and the drill motor for locking the slip ring securely in place when the notches of the first housing and the slip ring are engaged.

In accordance with the present invention the first housing further comprises a coolant entry port so that coolant can be injected into the nose piece and made to flow around the drill bit.

In accordance with the present invention the first housing further comprises chip windows cut into the sides of the housing so that chips and dust can be removed from the area being drilled.

In accordance with the present invention the first housing further includes means for mounting the bushing means within the end of the housing that is opposite the second housing.

In accordance with the present invention the bushing means comprises a radial bushing and a complimentary lock bushing the diameter of which is determined by the diameter of the drill bit being used.

In accordance with the present invention the bushing means further includes means for delivering coolant to the drill bit and the work piece at the point of contact between the drill bit and the work piece.

These and other objects, features and advantages of the present invention will become more readily apparent with a reading of the following more detailed description of the preferred embodiment in conjunction with the accompanying drawings and claims. The drawings in which like reference characters indicate corresponding parts in all views are not necessarily to scale, emphasis instead being placed on illustrating the principles of the invention.

BRIEF DESCRIPTION OF THE DRAWINGS

FIG. 2 is a cross-sectional view of the nose piece of the present invention taken along section line 2—2.

BEST MODE OF CARRYING OUT THE INVENTION

Figure 1:
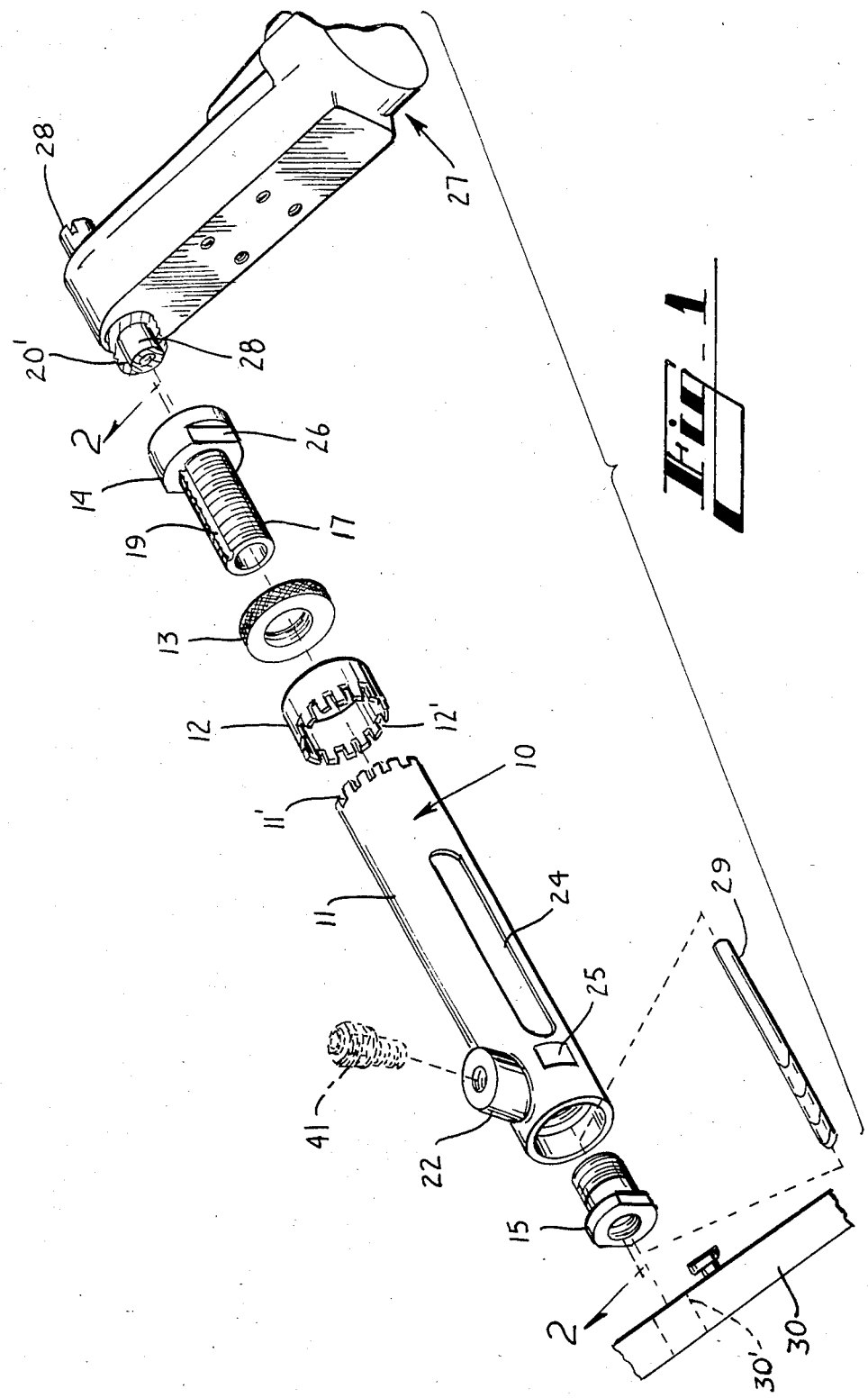
FIG. 1 is an exploded view of the nose piece of the present invention.

Referring now to FIGS. 1 and 2 a nose piece 10 includes a first housing 11, a slip ring 12, a jam nut 13, a complimentary second housing 14, a reducer bushing 15, and a locking bushing 31. Nose piece 10 is an accessory for a power drill, the drill having a drill motor 27 with a drill spindle 28 and a drill bit 29 attached to the spindle. When assembled, nose piece 10 attaches to the drill motor 27 by means of threads 20 on the interior motor end of second housing 14 and threads 20' on drill motor 27. The coupling of nose piece 10 and the drill motor 27 is done in such a way that the drill spindle 28 and any attached drill bit 29 project into and through the central bore 16 of nose piece 10. Second housing 14 is circumferentially threaded 17 along most of its length so that it may be threaded into complimentary first housing 11, which has internal threads 18 along a portion of its length. Longitudinal slot 19 is cut into one side of second housing 14 and slip ring pin 21 is engaged thereby so that slip ring 12 can move longitudinally along housing 14 but is prevented from radial movement about housing 14. When the housing 11 is properly adjusted with respect to the length of the drill bit 29 and the angular position of coolant port 22 with respect to the work piece, slip ring 12 is pushed against housing 11 such that slip ring notches 12' and housing notches 11' mesh. Slip ring 12 is then locked in this position by tightening jam nut 13 firmly against its unnotched end. When this is accomplished the linear and angular position of the nose piece is fixed until a change is made necessary by the shape of the work piece or length of the drill bit 29, or length of bushing 31, and nose piece 10 is locked into drill jig 30.

Reducer bushing 15 screws into the internally threaded end of housing 11 which is not notched and is itself internally threaded to accept locking bushing 31. Reducer bushing 15 is channeled so that coolant can flow directly from coolant port 22 into coolant channel 23 and thereby be carried directly to the drill bit 29 and the point of its contact with the work piece. Coolant port 22 is also internally threaded to accept fitting 41 to facilitate the introduction of coolant into nose piece 10. Chips, dust and other by-products of drilling are removed from the area being drilled by the helical motion of the drill flutes and expelled from the nose piece through chip windows 24, housings 11 and 14 have had flats 25 and 26 machined into them to facilitate the use of wrenches and other such tools in the assembly and disassembly of nose piece 10.

Although the present invention has been discussed and described with primary emphasis on one preferred embodiment, it should be obvious that adaptations and modifications can be made thereto without departing from the spirit and scope of the invention.

I claim:

1. A nose piece for a power drill, said drill having a drill motor, a drill spindle, and a drill bit attached to said spindle comprising:
   (a) a first housing for enclosing said drill bit and said drill spindle;
   (b) means for attaching said housing to said drill motor and varying both the linear and radial relationships between said housing and said drill bit;
   (c) bushing means connected on one end to said first housing and on the opposite end to a drill jig so that said drill bit must pass through said bushing means to contact a work piece; and
   (d) clocking means for adjusting and fixing the linear and radial positions of said housing with respect to said drill bit and said work piece.

2. The nose piece of claim 1 wherein said means for attaching said housing to said drill motor comprises a complimentary second housing circumferentially threaded to telescopically engage said first housing so that a variable relationship is created between the linear and radial positions of said first housing and said drill bit and said work piece and means for coupling said second housing with said drill motor.

3. The nose piece of claim 1 wherein said clocking means comprises a slip ring encircling said second housing having a one edge notched to engage complimentary notches on the adjacent end of said first housing; a pin extending through said ring to engage a linear slot running from end to end of said second housing so that the position of said slip ring on said second housing may be varied along the long axis of said second housing but the radial position of said slip ring on said second housing remains constant and a jam nut positioned between said slip ring and said drill motor.

4. The nose piece of claim 1 wherein said first housing further comprises a coolant entry port whereby coolant can be injected into said nose piece and made to flow around said drill bit.

5. The nose piece of claim 1 wherein said first housing further comprises at least one chip window cut into the sides of said housing whereby chips and dust can be evacuated from the work piece.

6. The nose piece of claim 1 wherein said first housing further includes means for mounting said bushing means within said first housing.

7. The nose piece of claim 1 wherein said bushing means comprises a reducer bushing and a complimentary lock bushing the diameter of which is determined by the the diameter of the drill bit being used.

8. The nose piece of claim 1 wherein said bushing means further including means for delivering coolant to said drill bit and the work piece at the point of contact between said drill bit and said work piece.

* * * * *